United States Patent [19]
Cavaterra et al.

[11] 3,948,959
[45] Apr. 6, 1976

[54] PROCESS FOR PREPARING ALPHA, BETA UNSATURATED ACIDS BY CATALYTIC OXIDATION OF CORRESPONDING SATURATED ACIDS IN THE GAS PHASE

[75] Inventors: Enrico Cavaterra, Saronno (Varese); Guido Petrini, Milan; Romano Covini, Milan; Luciano Moreschini, Milan, all of Italy

[73] Assignee: Montedison S.p.A., Milan, Italy

[22] Filed: Aug. 12, 1974

[21] Appl. No.: 496,516

[30] Foreign Application Priority Data
Aug. 13, 1973  Italy.................................. 27817/73

[52] U.S. Cl. ......... 260/405.5; 252/437; 260/526 N; 260/595; 260/682
[51] Int. Cl.²......................................... C07C 51/24
[58] Field of Search............ 260/526 N, 486 D, 413, 260/405.5

[56] References Cited
UNITED STATES PATENTS
3,634,494  1/1972  Tsu................................. 260/526 N
3,652,654  3/1972  Tsu................................. 260/526 N
3,770,812  11/1973  Blood et al. .................... 260/526 N
3,781,336  12/1973  Chono et al. ................... 260/526 N
3,855,279  12/1974  Watkins.......................... 260/526 N Primary Examiner—Vivian Garner

[57] ABSTRACT

Alpha, beta-unsaturated acids are obtained by gas-phase catalytic oxidation of saturated acids containing from 3 to 8 carbon atoms. The catalyst used has the empirical composition $$FeP_xMe_yO_z$$

in which
Me is one or more of the elements Li, Na, K, Rb, Cs, Mg, Ca, Sr and Ba;
$x$ is 0.2 to 3;
$y$ is 0.01 to 2; and
$z$ is a value corresponding to the average valences of the elements in the oxidation states in which they exist in the catalyst.

2 Claims, No Drawings

PROCESS FOR PREPARING ALPHA, BETA UNSATURATED ACIDS BY CATALYTIC OXIDATION OF CORRESPONDING SATURATED ACIDS IN THE GAS PHASE

THE PRIOR ART

The catalytic dehydrogenation of lower aliphatic acids is known and has been described previously. According to one known process, for example, a metal oxide is used as a catalyst and reagent, and dehydrogenation is conducted in the absence of molecular oxygen.

In that method, however, the catalyst is rapidly reduced and deactivated and requires frequent re-activations, while the degree of conversion of the saturated acid at every pass on the catalytic bed is very low, which results in considerable complications in carrying out the process and requires use of large apparatuses.

In this connection, reference is made to U.S. Pat. No. 2,945,057 and to Ind. Eng. Chem. Prod. Res. and Development, volume II, page 287 (1963).

According to another known process, a metal sulphide is employed as dehydrogenating agent, in the absence of molecular oxygen, to dehydrogenate lower aliphatic acids and the esters thereof. In this process too, since the metal sulphide acting as dehydrogenating agent is converted as the reaction proceeds, frequent regenerations of the metal sulphide become necessary: see U.S. Pat. No. 3,370,087.

Furthermore, it is known since long how to prepare methacrylic acid by dehydrogenation of isobutyric acid in the presence of a catalyst consisting of iodine or hydrogen iodide. However, even using a large amount of iodine or hydrogen iodide, the selectivity in methacrylic acid remains limited: see in this connection Japanese Pat. No. 26,484/68.

Also, processes employing sulphur vapours as a reagent are known: see Japanese Pat. No. 8,208/69 and German Pat. No. 2,129,320.

More recently, alpha, beta-unsaturated aliphatic acids have been otained starting from the corresponding saturated acids by dehydrogenation conducted in the presence of molecular oxygen on solid catalysts. The catalysts employed, according to Belgian Pat. No. 766,404, consist of mixed phosphates of iron and bismuth, optionally also of lead.

THE PRESENT INVENTION

One object of this invention is to provide new process for preparing alpha, beta-unsaturated acids from corresponding saturated acids containing 3 to 8 carbon atoms which is free of the disadvantages associated with known processes.

This and other objects are accomplished by the invention in accordance with which alpha, beta-unsaturated acids are obtained by the catalytic oxidative dehydrogenation of carboxylic, aliphatic saturated acids having the general formula

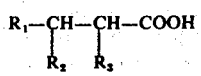

wherein $R_1$, $R_2$, $R_3$ represent a hydrogen atom or an alkyl radical containing from 1 to 5 carbon atoms, the maximum limit as to carbon atoms in the molecule being 8.

The process of the invention is characterized in that the reaction is conducted in the presence of a catalyst containing, in combination with oxygen, iron, phosphorus and one or more of the elements lithium, sodium, potassium, rubidium, cesium, calcium, strontium, barium, magnesium.

The saturated aliphatic acid is introduced into the catalytic reactor in a gaseous admixture with oxygen (air) and with one or more diluents such as nitrogen, steam, $CO_2$ etc. The amount of aliphatic acid contained in the reacting mixture is comprised between 1% and 40% by volume, the oxygen/saturated acid molar ratio ranging from 0.1/1 to 10/1, preferably from 0.4/1 to 4/1. The reaction temperature is comprised between 300° and 500°C.

In the process of this invention, it is possible to employ — with particularly favorable results — isobutyric acid and propionic acid as starting saturated acids in order to obtain methacrylic acid and acrylic acid respectively.

In the catalyst composition the above-mentioned elements are present in such amounts that the relative atomic ratios can be defined by the following empirical formula:

in which
Me is one or more of the elements Li, Na, K, Rb, Cs, Mg, Ca, Sr, Ba,
$x$ is 0.2 to 3,
$Y$ is 0.01 to 2, and
$z$ is a value corresponding to the average valences of the elements in the oxidation states in which they exist in the catalyst.

It is conventional, in this art, to identify the catalyst by empirical formula and to consider the elements as existing as oxides. However, as is understood by those skilled in the art, to assign a value to a symbol such as $z$ in the foregoing formula for the catalyst is not to say that all of the elenents making up the catalyst do exist as oxides, wholly or partially, since the actual oxidation state of the elements as they exist in the catalyst has not been established.

The catalytic composition used in the practice of this invention can be employed without a support and as such it exhibits excellent catalytic activity. Should it be preferable to employ the catalyst composition in combination with a support, it is possible to use as the support any suitable inorganic material such as silica, alumina, silicium carbide, silica-alumina, silicates, borates, carbonates, provided they are stable under the reaction conditions to which they will be subjected in the oxidative dehydrogenation of the starting saturated acids to the alpha, beta-unsaturated acids.

The amount of active catalyst composition by weight with respect to the support weight may vary within a wide range depending upon the characteristics of the support and the method of preparing the supported catalyst.

In the process of this invention, the catalyst may be used in the form of fixed or fluidized bed. In the latter case, both the character of the support and the method used to prepare the supported catalyst are of particular importance to the preparation of a microspheriodal catalyst having a suitable granulometirc distribution.

A microspheroidal catalyst can be prepared according to different techniques: for instance by spray-drying a solution or suspension of the support and of the components of the active catalyst composition, or by impregnating a pre-formed microspheroidal support with a solution of the components of the catalytically active composition.

As starting compounds for the preparation of the catalytic composition, according to this invention, the following compounds of alkaline metals, for example, may be used: nitrates, oxides, hydroxides, carbonates, bicarbonates, nitrites, phosphates, silicates, and oxyacid salts or salts of monocarboxylic or polycarboxylic organic acids such as formates, oxalates, citrates, tartrates, etc.

Starting iron compounds may be chosen, according to the method employed for the preparation of the catalyst, from nitrates, chlorides, sulphates, carbonates, monocarboxylic or polycarboxylic organic acid salts and chelates.

As for alkaline-earth metals, chlorides, sulphates, carbonates, salts of monocarboxylic or polycarboxylic organic acids, etc., can be used.

For phosphorus, alkaline phosphates may be used, ammonium phosphates, phosphoric or phosphorous acids, etc.

All methods of preparation involve a final activation phase of the catalytic combination which consists of heating it, in the presence of air or of a mixture of air and steam, at a temperature between 350° and 850°C, preferably between 400° and 700°C.

The preparation of the catalyst may be accomplished in accordance with known techniques.

The following methods have been found useful in the preparation of the catalyst:

1. In an aqueous solution of phosphoric acid are dissolved predetermined quantities of iron salts and of alkaline or alkaline-earth metals salts. To this is then added ammonia up to pH 7. The suspension obtained in this way is then evaporated to dryness under stirring, with the residue being dried further at 130°C for one night and then activated in air at 540°C for 2 hours. The calcined mass is then ground and sifted. The portion which passes through a mesh of 20–35 is suitable for use in a fixed bed reactor.

2. A suitable mixture of the components was digested with water and gradually evaporated to dryness under stirring. The residue was finely ground and then dried overnight at 130°C. The resulting mass was then activated in air for 2 hours at 130°C to 600°C.

3. The residue dried at 130°C, as per method 1, was treated in air at 300°C. The mass so obtained was ground to a size which passed through a 25-mesh screen; 10% of stearic acid powder was added and the mixture was pressed to 4 × 4 mm pastils. The pastils so obtained were activated for 2 hours in air at 540°C.

4. A solution of the catalyst components having a volume corresponding to that of the support was used to impregnate a microspheroidal silica of the commercial type. The resulting slurry was allowed to stand for 2 – 3 hours, after which it was evaporated to dryness under stirring and further dried overnight at 130°C. The product obtained was activated in a fluidized bed in air for 2 hours at 550°C. This preparation method is useful in preparing catalyst for fixed bed using a proper support.

Using the catalysts disclosed herein, high yields of unsaturated acid are obtained with very high conversions, in some cases up to 100%, of the corresponding saturated acid. Such result is attributable to the fact that the catalysts according to this invention promote an oxidative dehydrogenation process having a regular trend and which is easily controllable as regards reaction temperature and contact times.

The reagents may be fed onto the catalyst preheated to a temperature close to the reaction temperature or at least to a temperature slightly higher than the mixture dew point, in which case they rapidly heat on contacting the catalytic bed, either of the fixed or fluidized type.

The reagents may be fed to the catalyst already premixed either thoroughly or in part or individually. Feeding of the reagents partially premixed or individually is best applied in general to a fluidized bed reactor.

It is also possible to introduce a part of the air or, optionally, all of the saturated acid or a part thereof, into the reactor bottom and successively to feed the remaining amounts of reagents to one or more upper points inside the catalytic bed.

When the reaction is conducted according to the catalytic fixed bed technique, such bed may be prepared, according to the art, by arranging the catalyst inside the tubes of a tube bundle reactor and by removing the reaction heat by proper fluids circulating outside the tubes and, for example, more generally, by means of molten salts mixtures. It is also possible to operate in a reactor consisting of several adiabatic reaction stages alternated with zones for cooling the reacted mixture.

The reaction is conducted at a temperature ranging from 300° to 500°C, preferably from 340° to 440°C.

The contact time, expressed in seconds as the ratio between the catalytic bed volume and the volumes of the reagents gaseous mixture fed per second, measured under the average conditions of temperature and pressure existing in the catalytic bed, may vary depending upon the nature of the catalyst, the nature of the catalytic bed, i.e. fixed or fluidized, and upon the catalyst size; generally it may be comprised between 0.1 and 20 seconds, a preferred range being from 0.3 to 15 seconds, as corresponding to the most usual practical operating conditions.

The total pressure at which the reaction is conducted is not particularly important, and may vary within a wide range. It is selected, in part, for reasons of economy but generally, pressures of about atmospheric or pressures slightly higher than atmospheric pressure are used.

The following examples are given to illustrate the invention in more detail and are not intended to be limiting.

EXAMPLE 1

The catalyst was prepared according to method 1 described hereinabove and in particular 242.5 grams of iron nitrate, 27.6 grams of lithium nitrate and 127 grams of 85% phosphoric acid were dissolved in 600 ml of water. The solution was slowly treated, under stirring, with 230 ml of 32% ammonia. The resulting slurry was slowly evaporated to dryness under stirring and then further dried overnight at 130°C. The product so obtained was activated in a muffle for 2 hours at 540°C. The atomic ratio of the elements of which it consisted are defined by the empirical formula $Fe_1P_{1.84}Li_{0.66}$.

The oxidative dehydrogenation reaction was carried out in a reactor charged with said catalyst, in the form of a fixed bed. The feeding mixture was made up of isobutyric acid, air, water and nitrogen according to the following molar ratios: 1/5/25/55. The reaction temperature was 380°C and the contact time 1.0 seconds. On the basis of the gas-chromatographic analysis of the reaction gases, a conversion of the fed isobutyric acid of 95.2% and a selectivity in methacrylic acid of 77.0%, in propylene of 5.4%, in acetone of 13.1%, in $CO_2$ of 1.4% and in CO of 3.1% were calculated.

As the term is used herein, selectivity means the ratio:

$$\frac{\text{obtained grams of C of the product considered}}{\text{grams of C of the reacted isobutyric acid}} \times 100.$$

EXAMPLE 2

The catalyst was prepared according to method 1 described hereinabove and the atomic ratios of the elements of which it was made up are defined by the empirical formula $Fe_1P_{1.84}Cs_{0.66}$.

The oxidative dehydrogenation reaction was conducted in a reactor charged with the catalyst, in the form of a fixed bed. The feeding mixture was made up of isobutyric acid, air, water and nitrogen according to the following molar ratios: 1/3.6/25/55. The reaction temperature was 360°C and the contact time 0.5 seconds. On the basis of the gas-chromatographic analysis of the reaction gases it was possible to determine a yield in methacrylic acid of 85.0%, the term "yield", as used herein, meaning the ratio:

$$\frac{\text{grams of C of the obtained methacrylic acid}}{\text{grams of C of the fed isobutyric acid}} \times 100.$$

EXAMPLE 3

The catalyst was prepared according to method 1 described hereinbefore and the atomic ratios of the elements of which it consisted are defined by the empirical formula $Fe_1P_{1.84}Cs_{0.66}$.

The oxidative dehydrogenation reaction was carried out in a reactor charged with the catalyst, in the form of a fixed bed. The feeding mixture was made up of isobutyric acid, air, water and nitrogen according to the following molar ratios: 1/3.1/25/55. The reaction temperature was 380°C and the contact time 0.5 seconds. On the basis of the gas-chromatographic analysis of the reaction gases it was possible to determine a selectivity in methacrylic acid of 90.0%, in propylene of 2.3%, in acetone of 5.8%, in $CO_2$ of 1.2%, in CO of 0.7%.

EXAMPLE 4

The catalyst was prepared according to method 1 described hereinbefore and the atomic ratios among the elements constituting it are defined by the empirical formula $Fe_1P_{1.84}Na_{0.66}$.

The oxidative dehydrogenation reaction was conducted in a reactor charged with said catalyst, in the form of a fixed bed. The feeding mixture was made up of isobutyric acid, air, water and nitrogen according to the following molar ratios: 1/3.1/25/55. The reaction temperature was 360°C and the contact time 0.5 seconds. On the basis of the gas-chromatographic analysis of the reaction gases it was possible to determine a selectivity in methacrylic acid of 85.0%, in propylene of 3.2%, in acetone of 8.3%, in $CO_2$ of 1.4% and in CO of 2.1%.

EXAMPLE 5

The catalyst was prepared according to method 1 described hereinbefore and the atomic ratios of the elements constituting it are defined by the empirical formula $Fe_1P_{1.84}Na_{0.66}$.

The oxidative dehydrogenation reaction was conducted in a reactor charged with said catalyst in the form of a fixed bed. The feeding mixture was made up of isobutyric acid, air, water and nitrogen according to the following molar ratios: 1/5/25/55. The reaction temperature was 360°C and the contact time 0.5 seconds.

On the basis of the gas-chromatographic analysis of the reaction gases it was possible to determine a yield in methacrylic acid equal to 76.5%.

EXAMPLE 6

The catalyst was prepared according to method 1 illustrated hereinabove and the atomic ratios of the elements constituting it are defind by the empirical formula $Fe_1P_{1.94}K_{0.77}$.

The oxidative dehydrogenation reaction was carried out in a reactor charged with said catalyst, in the form of a fixed bed.

The feeding mixture was made up of isobutyric acid, air, water and nitrogen according to the following molar ratios: 1/3.6/25/55. The reaction temperature was 360°C and the contact time 0.5 seconds. On the basis of gas-chromatographic analysis of the reaction gases it was possible to calculate a conversion of the fed isobutyric acid equal to 93.0% and a selectivity in methacrylic acid of 86.0%, in propylene of 2.6%, in acetone of 8.4%, in $CO_2$ of 1.8%, in CO of 1.2%.

EXAMPLE 7

The catalyst was prepared according to method 2 described herinbefore and the atomic ratios of the elements constituting it are defined by the empirical formula $Fe_1P_{1.9}K_{0.72}$.

The oxidative dehydrogenation reaction was conducted in a reactor charged with the catalyst, in the form of a fixed bed.

The feeding mixture was made up of isobutyric acid, air, water and nitrogen according to the following molar ratios: 1/5/25/55. The reaction temperature was 340°C and the contact time 0.5 seconds. On the basis of the gas-chromatographic analysis of the reaction gases, it was possible to determine a conversion of the fed isobutyric acid of 97.0% and a selectivity in methacrylic acid of 81.5%, in propylene of 2.4%, in acetone of 11.6%, in $CO_2$ of 3.5% and in CO of 1.0%.

EXAMPLE 8

The catalyst was prepared according to method 2 illustrated hereinabove, and the atomic ratios of the elements composing it are defined by the empirical formula $Fe_1P_{2.75}K_{1.5}$.

The oxidative dehydrogenation reaction was conducted in a reactor charged with said catalyst, in the form of a fixed bed.

The feeding mixture was made up of isobutyric acid, air, water and nitrogen according to the following molar ratios: 1/5/25/55. The reacton temperature was 400°C and the contact time 1.0 seconds. On the basis of the gas-chromatographic analysis of the reaction gases a selectivity in methacrylic acid equal to 60.0% was calculated.

EXAMPLE 9

The catalyst was prepared according to method 2 described hereinabove and the atomic ratios of the elements it was made up of are defined by the empirical formula $Fe_1P_{2.2}K_1$.

The oxidative dehydrogenation reaction was conducted in a reactor charged with the catalyst, in the form of a fixed bed. The feeding mixture was made up of isobutyric acid, air, water and nitrogen according to the following molar ratios: 1/3/6/25/55. The reaction temperature was 385°C and the contact time 1.0 seconds. On the basis of the gas-chromatographic analysis of the reaction gases it was possible to determine a selectivity in methacrylic acid of 73.0%, in propylene of 9.9%, in acetone of 12.0%, in $CO_2$ of 0.7%, in CO of 4.4%.

EXAMPLE 10

The catalyst was prepared according to method 1 described above, and the atomic ratios of the elements it was made up of are defined by the empirical formula $Fe_1P_{1.84}K_{0.66}$.

The oxidative dehydrogenation reaction was conducted in a reactor charged with the catalyst, in the form of a fixed bed. The feeding mixture was composed of isobutyric acid, air, water and nitrogen according to the following molar ratios: 1/5/25/55. The reaction temperature was 320°C and the contact time 0.5 seconds. On the basis of the gas-chromatographic analysis of the reaction gases a conversion of the fed isobutyric acid equal to 82% and a selectivity in methacrylic acid of 80.0%, in propylene of 3.7%, in acetone of 12.4%, in $CO_2$ of 3.0%, in CO of 0.9% were calculated.

EXAMPLE 11

The catalyst was prepared according to method 3 described hereinabove, and the atomic ratios of the elements constituting it are defined by the empirical formula $Fe_1P_{1.4}K_{0.25}$.

The oxidative dehydrogenation reaction was conducted in a reactor charged with said catalyst, in the form of a fixed bed. The feeding mixture was composed of isobutyric acid, air water and nitrogen according to the following molar ratios: 1/3.6/25/55. The reaction temperature was 435°C and the contact time 0.5 seconds. On the basis of the gas-chromatographic analysis of the reaction gases a conversion of the fed isobutyric acid of 95.0% and a selectivity in methacrylic acid of 74.0%, in propylene of 8.7%, in acetone of 9.0%, in $CO_2$ of 5.3% and in CO of 3.0% were determined.

EXAMPLE 12

The catalyst was prepared according to method 3 described above and the atomic ratios of the elements it was made up of are defined by the empirical formula $Fe_1P_{1.4}K_{0.25}$.

The oxidative dehydrogenation reaction was carried out in a reactor charged with said catalyst in the form of a fixed bed. The feeding mixture was made up of isobutyric acid, air, water and nitrogen according to the following molar ratios: 1/3.6/25/55. The reaction temperature was 415°C and the contact time 1.0 second. On the basis of the gas-chromatographic analysis of the reaction gases, it was possible to determine a conversion of the fed isobutyric acid of 97.5% and a selectivity in methacrylic of 76.5%, in propylene of 6.3%, in acetone of 9.5%, in $CO_2$ of 5.6%, in CO of 2.1%.

EXAMPLE 13

The catalyst was prepared according to method 4 described hereinabove and was made up, for about 70%, of a $SiO_2$ support and for the remaining portion of an active catalyst in which the atomic ratios of the elements of which it was composed are defined by the empirical formula $Fe_1P_{1.84}K_{0.66}$.

The oxidative dehydrogenation reaction was carried out in a reactor charged with the catalyst, in the form of a fixed bed. The feeding mixture was made up of isobutyric acid, air, water and nitrogen according to the following molar ratios: 1/3.6/25/55. The reaction temperature was 390°C and the contact time 0.5 seconds. On the basis of the gas-chromatographic analysis of the reaction gases it was possible to determine a conversion of the fed isobutyric acid of 92.0% and a selectivity in methacrylic acid of 81.0%, in propylene of 3.3%, in acetone of 11.3%, in $CO_2$ of 3.5%, in CO of 0.9%.

EXAMPLE 14

The catalyst was prepared according to method 4 described above and was composed for about 65% of a microspheroidal $SiO_2$ support and for the remaining portion by an active catalyst in which the atomic ratios of the elements constituting it are defined by the empirical formula $Fe_1P_{1.4}K_{0.25}$.

The oxidative dehydrogenation reaction was carried out in a reactor charged with said catalyst, in the form of a fixed bed. The feeding mixture was composed by isobutyric acid, air, water and nitrogen according to the following molar ratios: 1/3.1/25/55. The reaction temperature was 340°C and the contact time 0.5 seconds. On the basis of the gas-chromatographic analysis of the reaction gases it was possible to calculate a selectivity in methacrylic acid of 86.0%, in propylene of 3.2%, in acetone of 8.3%, in $CO_2$ of 1.6%, in CO of 0.9%.

EXAMPLE 15

The catalyst was prepared according to method 1 described herein and the atomic ratios of the elements constituting it are defined by the empirical formula $Fe_1P_{1.4}Ca_{0.25}$.

The oxidative dehydrogenation reaction was conducted in a reactor charged with said catalyst in the form of a fixed bed. The feeding mixture was made up of isobutyric acid, air, water and nitrogen according to the following molar ratios: 1/5/25/55. The reaction temperature was 320°C and the contact time 0.5 seconds. On the basis of the gas-chromatographic analysis of the reaction gases it was possible to calculate a conversion of the fed isobutyric acid of 94.% and a selectivity in methacrylic acid of 80.5%, in propylene of 2.4%, in acetone of 9.9%, in $CO_2$ of 4.2% and in CO of 3.0%.

EXAMPLE 16

The catalyst was prepared according to method 2 described herein and the atomic ratios of the elements constituting it are defined by the empirical formula $Fe_1P_{1.4}Sr_{0.25}$.

The oxidative dehydrogenation reaction was carried out in a reactor charged with the catalyst, in the form of a fixed bed. The feeding mixture was made up of isobutyric acid, air, water and nitrogen according to the following molar ratios: 1/3.6/25/55. The reaction temperature was 320°C and the contact time 0.5 seconds. On the basis of the gas-chromatographic analysis of the reaction gases it was possible to determine a conversion of the fed isobutyric acid of 92.1% and a selectivity in methacrylic acid of 83.2%, in propylene of 2.2%, in acetone of 10.0%, in $CO_2$ of 2.8%, in CO of 1.9%.

EXAMPLE 17

The catalyst was prepared according to method 3 described herein and the atomic ratios of the elements constituting it are defined by the following empirical formula: $Fe_1P_{1.4}Mg_{0.25}$.

The oxidative dehydrogenation reaction was conducted in a reactor charged with the catalyst in the form of a fixed bed. The feeding mixture was made up of isobutyric acid, air, water and nitrogen according to the following molar ratios: 1/6.25/25/55. The reaction temperature was 320°C and the contact time 0.5 seconds. On the basis of the gas-chromatographic analysis of the reaction gases, a conversion of the fed isobutyric acid of 92.4% and a selectivity in methacrylic acid of 79.5%, in propylene of 2.7%, in acetone of 12.7%, in $CO_2$ of 4.0%, in CO of 1.1% were determined.

EXAMPLE 18

The catalyst was prepared according to method 4 described herein and was composed for about 70% of a microspheriodal $SiO_2$ support and for the remaining portion of an active catalyst in which the atomic ratios of the elements constituting it are defined by the empirical formula $Fe_1P_{1.84}K_{0.66}$.

The oxidative dehydrogenation reaction was conducted in a reactor charged with said catalyst, in the form of a fluidized bed. The feeding mixture was made up of isobutyric acid, air and water according to the following molar ratios: 1/2.5/44. The reaction temperature was 360°C and the contact time 1.3 seconds. On the basis of the gas-chromatographic analysis of the reaction gases, a conversion of the fed isobutyric acid of 88.0% and a selectivity in methacrylic acid of 80.1% were determined.

What we claim is:

1. A process for preparing alpha, beta-unsaturated aliphatic carboxylic acids containing 3 to 8 carbon atoms, from the corresponding saturated acids having the following general formula:

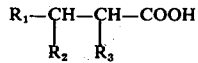

wherein $R_1$, $R_2$, $R_3$ are H or alkyl radicals having 1 to 5 carbon atoms, by oxidative dehydrogenation in the vapour phase, with oxygen or oxygen-containing gaseous mixtures, at temperatures ranging from 300° to 500°C and in the presence of a catalyst containing, in combination with oxygen, iron, phosphorus and at least one element selected from the group consisting of lithium, sodium, potassium, rubidium, cesium, calcium, strontium, barium and magnesium, in an amount such that the atomic ratios of the various elements are defined by the empirical formula $FeP_xMe_yO_z$ where Me is at least one of the aforementioned alkaline or alkaline-earth elements, $x$ is 0.2 to 3, $y$ is 0.01 to 2 and $z$ is the amount of oxygen bound to the other elements and corresponding to their state of oxidation in the catalyst.

2. The process according to claim 1, in which the starting saturated acid is fed to the reaction zone in the form of a gaseous mixture containing oxygen and at least one diluent selected from the group consisting of nitrogen, steam, $CO_2$ or other inert gas, the percentage of acid in the mixture ranging from 1% 40% volume and the oxygen: acid molar ratio being between 0.1/1 and 10/1.

* * * * *

UNITED STATES PATENT OFFICE
CERTIFICATE OF CORRECTION

Patent No. 3,948,959          Dated April 6, 1976

Inventor(s) Enrico CAVATERRA et al

It is certified that error appears in the above-identified patent and that said Letters Patent are hereby corrected as shown below:

Column 2, line 67,     "microspheriodal" should be

- - - microspheroidal - - -.

Col. 6, line 38, (Example 7),   "herinbefore" should be

- - - hereinbefore - - -.

Col. 10, line 34 (Claim 2),   "by" should appear before

- - - volume - - -.

Signed and Sealed this

Fourth Day of April 1978

[SEAL]

Attest:

RUTH C. MASON
*Attesting Officer*

LUTRELLE F. PARKER
*Acting Commissioner of Patents and Trademarks*